(12) United States Patent
Ogasahara

(10) Patent No.: US 8,988,591 B2
(45) Date of Patent: Mar. 24, 2015

(54) SOLID-STATE IMAGING DEVICE, CAMERA MODULE, AND FOCUS ADJUSTMENT METHOD OF CAMERA MODULE

(75) Inventor: Takayuki Ogasahara, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 297 days.

(21) Appl. No.: 13/458,135

(22) Filed: Apr. 27, 2012

(65) Prior Publication Data

US 2013/0100311 A1 Apr. 25, 2013

(30) Foreign Application Priority Data

Oct. 24, 2011 (JP) ................................ 2011-232724

(51) Int. Cl.
*H04N 5/232* (2006.01)
*H04N 9/04* (2006.01)

(52) U.S. Cl.
CPC ........... *H04N 5/23212* (2013.01); *H04N 9/045* (2013.01)
USPC ......................................................... 348/349

(58) Field of Classification Search
CPC .............................. H04N 5/23212; G03B 13/36
USPC ............................................... 348/223.1, 349
See application file for complete search history.

(56) References Cited

U.S. PATENT DOCUMENTS

| 5,721,978 A * | 2/1998 | Saito ............................. 396/100 |
| 7,512,262 B2 * | 3/2009 | Criminisi et al. ............. 382/154 |
| 7,990,461 B2 * | 8/2011 | Kinugasa ....................... 348/350 |
| 2011/0043665 A1 | 2/2011 | Ogasahara |
| 2012/0229628 A1 * | 9/2012 | Ishiyama et al. .............. 348/135 |
| 2013/0010106 A1 * | 1/2013 | Yokota ........................... 348/135 |
| 2013/0016251 A1 * | 1/2013 | Ogasahara .................... 348/238 |
| 2013/0201391 A1 | 8/2013 | Ogasahara |

FOREIGN PATENT DOCUMENTS

| JP | 2007/235862 | 9/2007 |
| JP | 2008-524924 | 7/2008 |
| JP | 2009-17544 | 1/2009 |
| JP | 2010/107664 | 5/2010 |
| WO | WO 2006/065372 A2 | 6/2006 |

OTHER PUBLICATIONS

Office Action mailed Nov. 25, 2014 in Japanese Application No. 2011-232724 filed Oct. 24, 2011 (w/English translation).

* cited by examiner

*Primary Examiner* — Gary C Vieaux
(74) *Attorney, Agent, or Firm* — Oblon, McClelland, Maier & Neustadt, L.L.P.

(57) ABSTRACT

According to one embodiment, a solid-state imaging device includes an imaging processing circuit and a focus drive control section. The imaging processing circuit includes a luminance information generating section and a disparity amount calculating section. The luminance information generating section generates first luminance information from a first image signal. The disparity amount calculating section calculates a disparity amount based on the first luminance information and second luminance information. The second luminance information is contained in a second image signal. The focus drive control section controls the focus drive in accordance with a subject distance obtained using the disparity amount.

20 Claims, 13 Drawing Sheets

FIG.8

| B | G1 | B |
|---|----|---|
| G4 | R | G2 |
| B | G3 | B |

FIG.9

| R | G1 | R |
|---|----|---|
| G4 | B | G2 |
| R | G3 | R |

2 pix

FIG.13

| | SECOND LUMINANCE INFORMATION (MONOCHROME IMAGE SENSOR) | FIRST LUMINANCE INFORMATION (COLOR IMAGE SENSOR) |
|---|---|---|
| TYPE 1 | W W W W / W W W W / W W W W / W W W W | G G G G / G G G G / G G G G / G G G G |
| TYPE 2 | G G G G / G G G G / G G G G / G G G G | G G G G / G G G G / G G G G / G G G G |
| TYPE 3 | G G G G / G G G G / G G G G / G G G G | R R R R / R R R R / R R R R / R R R R  +  B B B B / B B B B / B B B B / B B B B |
| TYPE 4 | G G G G / G G G G / G G G G / G G G G | C C C C / C C C C / C C C C / C C C C  +  Y Y Y Y / Y Y Y Y / Y Y Y Y / Y Y Y Y |

FIG.14

| B | R | B | R |
|---|---|---|---|
| R | B | R | B |
| B | R | B | R |
| R | B | R | B |

FIG.15

| C | Y | C | Y |
|---|---|---|---|
| Y | C | Y | C |
| C | Y | C | Y |
| Y | C | Y | C |

FIG.16

|  | C1 |  |
|---|---|---|
| C4 | Y | C2 |
|  | C3 |  |

FIG.17

|  | Y1 |  |
|---|---|---|
| Y4 | C | Y2 |
|  | Y3 |  |

US 8,988,591 B2

SOLID-STATE IMAGING DEVICE, CAMERA MODULE, AND FOCUS ADJUSTMENT METHOD OF CAMERA MODULE

CROSS-REFERENCE TO RELATED APPLICATIONS

This application is based upon and claims the benefit of priority from Japanese Patent Application No. 2011-232724, filed on Oct. 24, 2011; the entire contents of which are incorporated herein by reference.

FIELD

Embodiments described herein relate generally to a solid-state imaging device, a camera module, and a focus adjustment method of the camera module.

BACKGROUND

Heretofore, a solid-state imaging device takes measures such as enlarging pixels, for example, to realize highly sensitive image photography. If an image sensor becomes large due to enlargement of pixels, a distance (focal length) from an imaging lens to a light receiving surface becomes long, which makes thinning of the camera module difficult.

Most image sensors adopt a so-called Bayer arrangement in which a red (R) pixel and a blue (B) pixel are arranged at opposing corners of a 2×2 pixel block, and two green (G) pixels are arranged at the remaining opposing corners. An image sensor in which one G pixel of the 2×2 pixel block is replaced with a white (W) pixel to realize the highly sensitive image photography has been proposed. The W pixel retrieves white light. A signal charge amount of a luminance signal can be sufficiently ensured by arranging the W pixel.

The W pixel retrieves light of a wavelength region wider than that of other color pixels, and thus the saturation of the output with respect to an incident light quantity to a pixel cell occurs before other color pixels. The image sensor including the W pixel may not obtain a sufficient sensitivity for each color as the saturation of the output with respect to the incident light quantity occurs in the W pixel. Furthermore, a crosstalk that occurs when the light leaks from the W pixel to the other color pixels adjacent to the W pixel easily occurs as a great amount of light is retrieved to the W pixel. The image sensor including the W pixel has a problem in the lowering of color reproducibility by the crosstalk.

A phase difference detection method and a contrast detection method have been known for an autofocus function of the camera module. The autofocus by the contrast detection method has a problem that the focus adjustment takes time because the focusing is carried out while moving the imaging lens. The autofocus by the phase difference detection method has a problem that miniaturization of the camera module is difficult because a dedicated sensor of the autofocus and a configuration for branching light to the dedicated sensor are arranged.

BRIEF DESCRIPTION OF THE DRAWINGS

FIGS. 8 and 9 are views describing the generation of first luminance information in a luminance information generating section;

FIG. 13 is a chart describing a variant related to the acquisition of synthesized luminance information by the synthesis of the first luminance information and the second luminance information;

FIG. 14 is a view describing an array of pixels in the color image sensor used in type 3;

FIG. 15 is a view describing an array of pixels in the color image sensor used in type 4;

FIG. 16 is a view describing the calculation of the luminance value of the C component for the Y pixel;

FIG. 17 is a view describing the calculation of the luminance value of the Y component for the C pixel;

DETAILED DESCRIPTION

In general, according to one embodiment, a solid-state imaging device includes a first image sensor, a second image sensor, an imaging processing circuit, and a focus drive control section. The first image sensor outputs a first image signal corresponding to an intensity distribution of each color light entering from a subject. The second image sensor outputs a second image signal corresponding to a luminance distribution of the light entering from the subject. The imaging processing circuit performs signal processing of the first image signal and the second image signal. The focus drive control section controls focus drive of a first imaging lens and a second imaging lens. The first imaging lens causes the light from the subject to enter the first image sensor. The second imaging lens causes the light from the subject to enter the second image sensor. The imaging processing circuit includes a luminance information generating section and a disparity amount calculating section. The luminance information generating section generates first luminance information for a specific color component from the luminance information extracted from the first image signal. The disparity amount calculating section calculates a disparity amount of a first image acquired by the first image sensor and a second image acquired by the second image sensor. The disparity amount calculating section calculates the disparity amount on the basis of the first luminance information and the second luminance information. The second luminance information is luminance information contained in the second image signal. The focus drive control section controls the focus drive according to a subject distance obtained using the disparity amount.

Exemplary embodiments of the solid-state imaging device, the camera module, and the focus adjustment method of the camera module will be explained below in detail with reference to the accompanying drawings. The present invention is not limited to the following embodiments.

Figure 1:
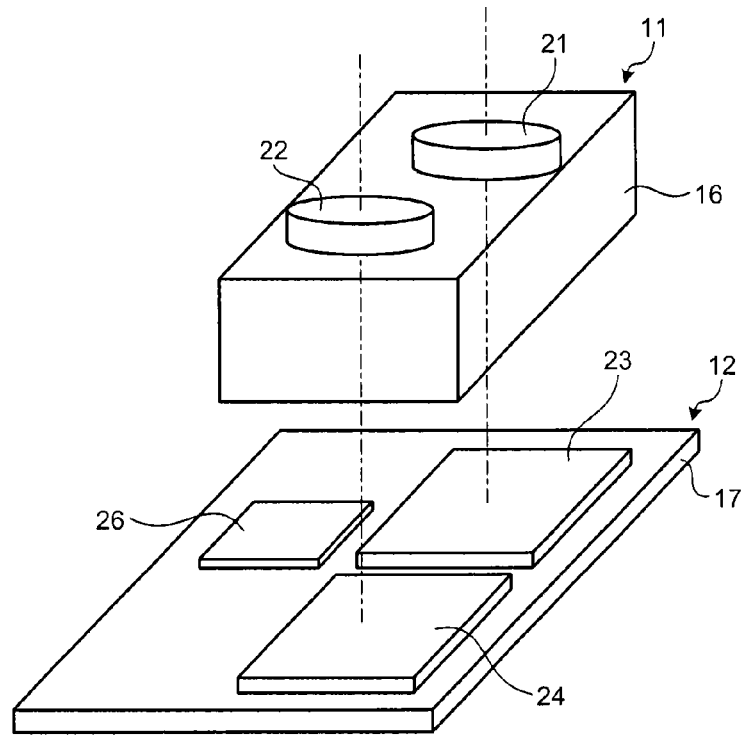
FIG. 1 is a perspective view schematically illustrating a partial configuration of a camera module applied with a solid-state imaging device according to an embodiment.
Figure 2:
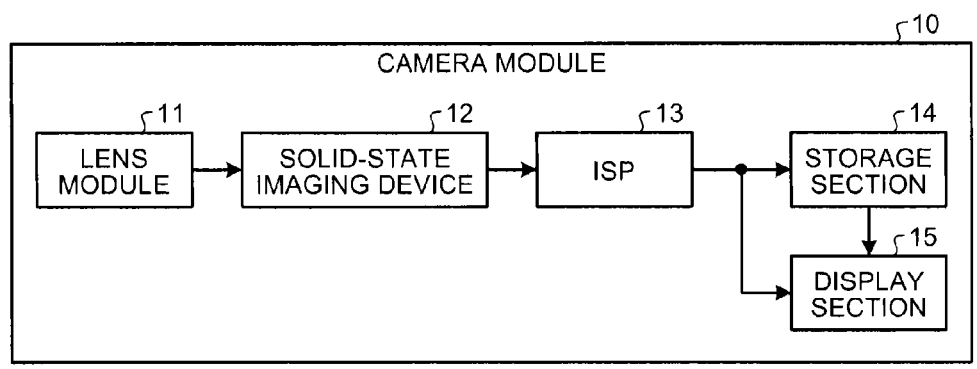
FIG. 2 is a block diagram illustrating a schematic configuration of the camera module.

FIG. 1 is a perspective view schematically illustrating a partial configuration of a camera module applied with a solid-state imaging device according to the embodiment. FIG. 2 is a block diagram illustrating a schematic configuration of the camera module.

A camera module 10 includes a lens module 11, a solid-state imaging device 12, an image signal processor (ISP) 13, a storage section 14, and a display section 15.

The lens module 11 retrieves light from a subject and forms an image of a subject image. The solid-state imaging device 12 images the subject image. The ISP 13 performs signal processing of the image signal obtained by the imaging of the solid-state imaging device 12.

The storage section 14 stores images subjected to the signal processing in the ISP 13. The storage section 14 outputs an image signal to the display section 15 in accordance with the operation, and the like of the user. The display section 15 displays an image in accordance with the image signal input from the ISP 13 or the storage section 14. The display section 15 is, for example, a liquid crystal display.

Figure 3:
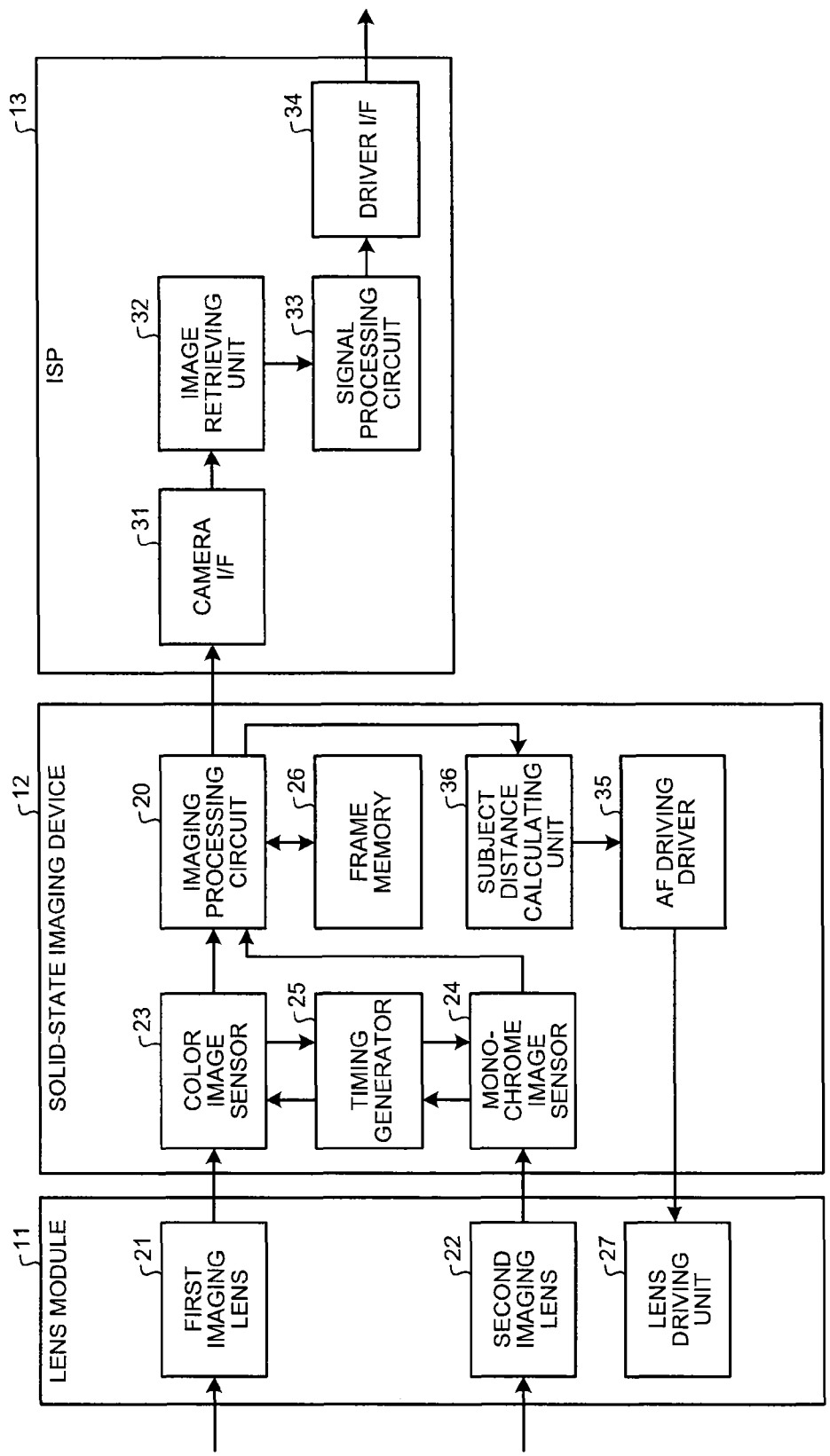
FIG. 3 is a block diagram illustrating details of a lens module, the solid-state imaging device, and an ISP.

FIG. 3 is a block diagram illustrating details of the lens module, the solid-state imaging device, and the ISP. The lens module 11 includes a first imaging lens 21, a second imaging lens 22, and a lens driving unit 27. The first imaging lens 21 retrieves light from the subject and causes the light to enter a color image sensor 23. The second imaging lens 22 retrieves light from the subject and causes the light to enter a monochrome image sensor 24.

As illustrated in FIG. 1, the first imaging lens 21 and the second imaging lens 22 are attached to a common lens holder 16. The first imaging lens 21 and the second imaging lens 22 are attached to the lens holder 16 while being held in a lens barrel, for example. The first imaging lens 21 and the second imaging lens 22 are lined in a direction perpendicular to an optical axis of the first imaging lens 21 and an optical axis of the second imaging lens 22 illustrated in the figure with a chain dashed line.

The solid-state imaging device 12 includes an imaging processing circuit 20, the color image sensor 23, the monochrome image sensor 24, a timing generator 25, a frame memory 26, an autofocus (AF) driving driver 35, and a subject distance calculating unit 36.

The color image sensor 23 includes an R pixel, a G pixel, and a B pixel arranged in a form of a Bayer arrangement, for example. The R pixel detects R light. The G pixel detects G light. The B pixel detects B light. The color image sensor 23 functions as a first image sensor for outputting RAW image data. The RAW image data is a first image signal corresponding to an intensity distribution of each color light entering from the subject.

The monochrome image sensor 24 includes a W pixel arranged in an array form. The W pixel detects W light. The monochrome image sensor 24 functions as a second image sensor for outputting monochrome image data. The monochrome image data is a second image signal corresponding to a luminance distribution of the light entering from the subject. The color image sensor 23 and the monochrome image sensor 24 adopt, for example, the LVDS (low voltage differential signaling) transmission method.

The imaging processing circuit 20 performs signal processing on the RAW image data from the color image sensor 23, and the monochrome image data from the monochrome image sensor 24. The imaging processing circuit 20 outputs synthesized image data obtained by synthesizing the RAW image data and the monochrome image data.

The frame memory 26 stores at least one of the RAW image data and the monochrome image data retrieved into the imaging processing circuit 20. In addition to being used for disparity correction described later, the frame memory 26 may also be used for high dynamic range (HDR) processing, image stabilization, and the like.

As illustrated in FIG. 1, the color image sensor 23, the monochrome image sensor 24, and the frame memory 26 are arranged on a common print substrate 17. The first imaging lens 21 is arranged facing the color image sensor 23. The second imaging lens 22 is arranged facing the monochrome image sensor 24.

The camera module 10 has a configuration suited for miniaturization as the color image sensor 23, the monochrome image sensor 24, and the frame memory 26 are aggregated on the common print substrate 17. The timing generator 25 generates a frame timing to apply to the RAW image data and the monochrome image data.

The subject distance calculating unit 36 calculates a subject distance in accordance with the disparity amount obtained by the imaging processing circuit 20. The AF driving driver 35 controls the lens driving unit 27 in accordance with the subject distance calculated by the subject distance calculating unit 36. The AF driving driver 35 functions as a focus drive control section for controlling the focus drive of the first imaging lens 21 and the second imaging lens 22 according to the subject distance obtained using the disparity amount.

Figure 4:
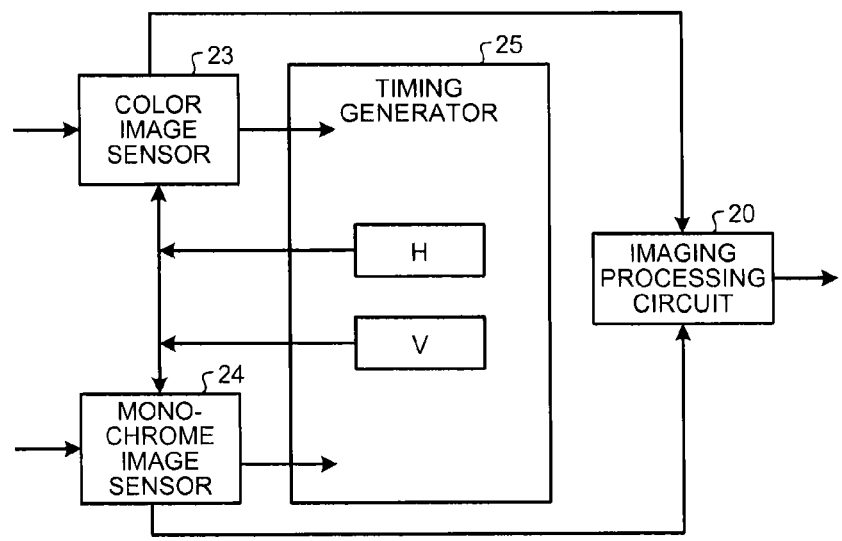
FIG. 4 is a block diagram describing adjustment of frame timing by a timing generator.

FIG. 4 is a block diagram describing adjustment of the frame timing by the timing generator. The timing generator 25 generates a horizontal synchronization signal H and a vertical synchronization signal V. The camera image sensor 23 coincides the frame timing with the horizontal synchronization signal H and the vertical synchronization signal V, and then outputs the RAW image data. The monochrome image sensor 24 coincides the frame timing with the horizontal synchronization signal H and the vertical synchronization signal V, and then outputs the monochrome image data.

Figure 5:
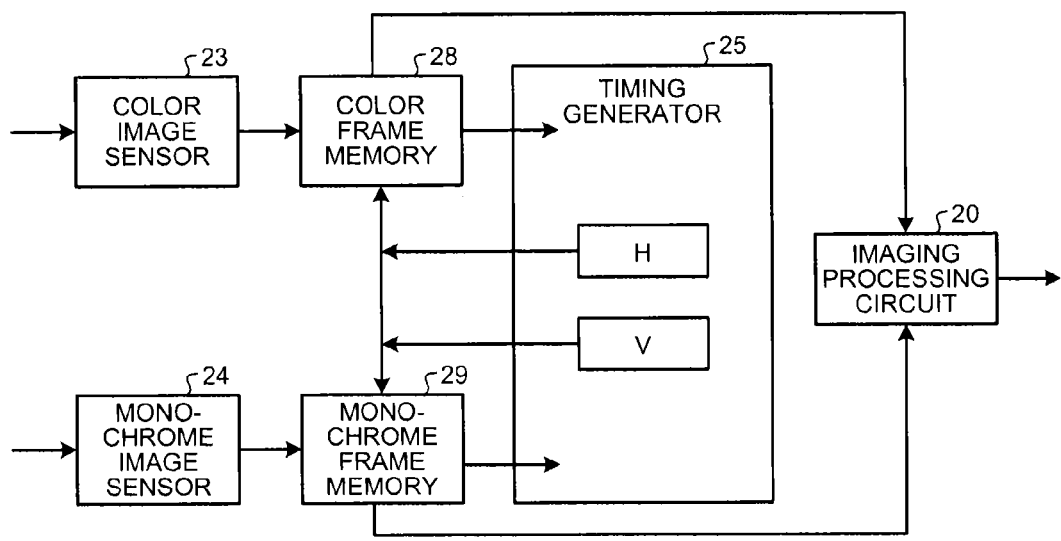
FIG. 5 is a block diagram describing adjustment of the frame timing of using a frame memory.

FIG. 5 is a block diagram describing adjustment of the frame timing of using the frame memory. A color frame memory 28 temporarily stores the RAW image data from the color image sensor 23. A monochrome frame memory 29 temporarily stores the monochrome image data from the monochrome image sensor 24. Assume, for example, that the frame memory 26 (see FIG. 3) includes the color frame memory 28 and the monochrome frame memory 29.

The color frame memory 28 coincides the frame timing of the stored RAW image data with the horizontal synchronization signal H and the vertical synchronization signal V, and then outputs the RAW image data. The monochrome frame memory 29 coincides the frame timing of the stored monochrome image data with the horizontal synchronization signal H and the vertical synchronization signal V, and then outputs the monochrome image data. The solid-state imaging device 12 may adjust the frame timing with either configuration of FIG. 4 or FIG. 5.

As illustrated in FIG. 3, the ISP 13 includes a camera interface (I/F) 31, an image retrieving unit 32, a signal processing circuit 33, and a driver interface (I/F) 34. The camera I/F 31 receives an input of the synthesized image data from the solid-state imaging device 12. The image retrieving unit 32 retrieves the synthesized image data input to the camera I/F 31.

The signal processing circuit 33 performs signal processing on the synthesized image retrieved to the image retrieving unit 32. The driver I/F 34 outputs the image data subjected to signal processing in the signal processing circuit 33 to the storage section 14 and the display section 15 (see FIG. 1).

Figure 6:
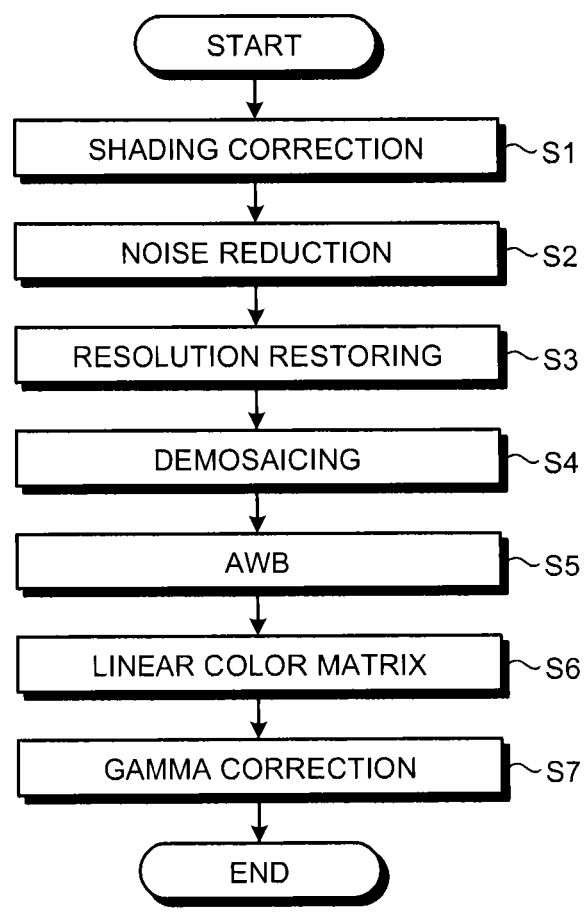
FIG. 6 is a flowchart describing a procedure of signal processing by a signal processing circuit of the ISP.

FIG. 6 is a flowchart describing a procedure of signal processing by the signal processing circuit of the ISP. The signal processing circuit 33 performs shading correction on the image retrieved to the image retrieving unit 32 (step S1). The signal processing circuit 33 corrects luminance unevenness caused by a light quantity difference of a central part and a peripheral part for the first imaging lens 21 and the second imaging lens 22 by the shading correction.

The signal processing circuit 33 performs noise reduction (step S2) for removing noise such as fixed pattern noise, dark current noise, and shot noise and resolution restoring process (step S3). The signal processing circuit 33 then performs a pixel interpolation process (demosaicing) (step S4) with respect to the digital image signal transmitted in the order of the Bayer arrangement. In demosaicing, a sensitivity level value of an insufficient color component is generated by the interpolation process of the image signal obtained by imaging. The signal processing circuit 33 synthesizes a color bit map image by the demosaicing.

The signal processing circuit 33 performs an automatic white balance control (AWB) (step S5) with respect to the color image. Furthermore, the signal processing circuit 33 performs a linear color matrix process (step S6) for obtaining color reproducibility and a gamma correction (step S7) for correcting chroma and brightness of the image displayed on a display or the like. The procedure of the signal processing in the signal processing circuit 33 described in the present embodiment is an example, and addition of other processes, omission of omissible processes, changing of order, and the like can be appropriately carried out.

The configuration for signal processing in the camera module 10 is roughly divided to the imaging processing circuit 20 in the pre-stage and the ISP 13 in the post-stage. In the camera module 10, the imaging processing circuit 20 and the ISP 13 function as image processing devices for performing signal processing on the image signals retrieved by the color image sensor 23 and the monochrome image sensor 24.

The lens driving unit 27 drives the first imaging lens 21 and the second imaging lens 22 in a direction of an optical axis for the focus adjustment of the first imaging lens 21 and the second imaging lens 22. The lens driving unit 27 collectively drives the first imaging lens 21 and the second imaging lens 22 by moving the lens holder 16.

The camera module 10 collectively drives the first imaging lens 21 and the second imaging lens 22 so that the lens module 11 can have a simple configuration compared to when individually driving the first imaging lens 21 and the second imaging lens 22.

Figure 7:
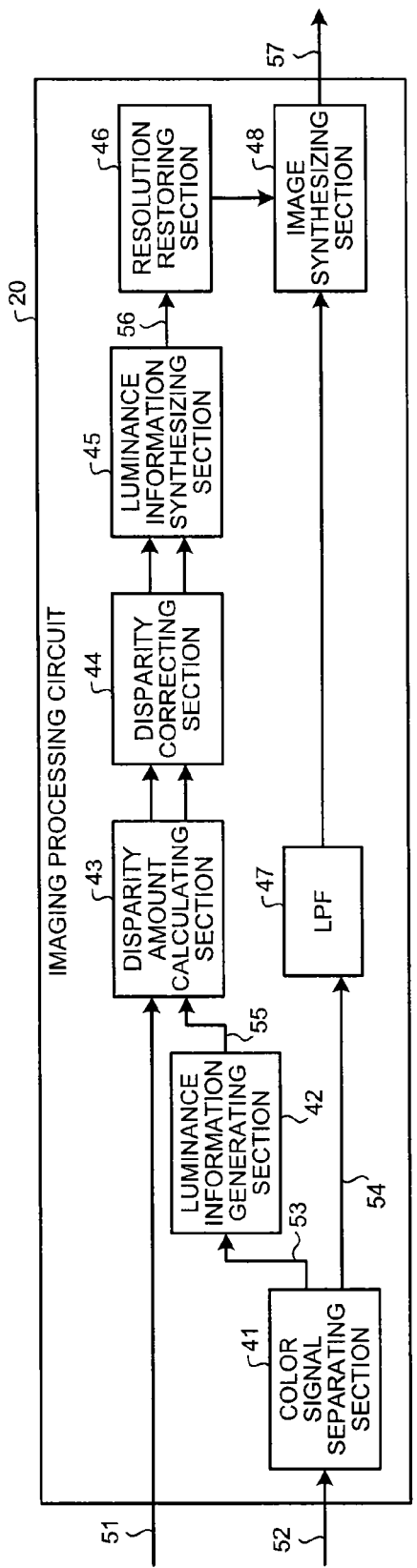
FIG. 7 is a block diagram illustrating details of an imaging processing circuit.

FIG. 7 is a block diagram illustrating details of the imaging processing circuit. The imaging processing circuit 20 includes a color signal separating section 41, a luminance information generating section 42, a disparity amount calculating section 43, a disparity correcting section 44, a luminance information synthesizing section 45, a resolution restoring section 46, a low pass filter (LPF) 47, and an image synthesizing section 48. The RAW image data 52 from the color image sensor 23 and the monochrome image data 51 from the monochrome image sensor 24 are input to the imaging processing circuit 20.

The color signal separating section 41 separates the RAW image data 52 input from the color image sensor 23 to luminance information 53 and color information 54. The color signal separating section 41 is an image signal separating section. The luminance information 53 is information corresponding to a luminance component of a YUV color space, for example. The color information 54 is information corresponding to a color difference component of the YUV color space, for example.

The luminance information generating section 42 generates first luminance information 55 for the G component, which is a specific color component, from the luminance information 53 extracted from the RAW image data 52 in the color signal separating section 41.

Figures 8, 9:
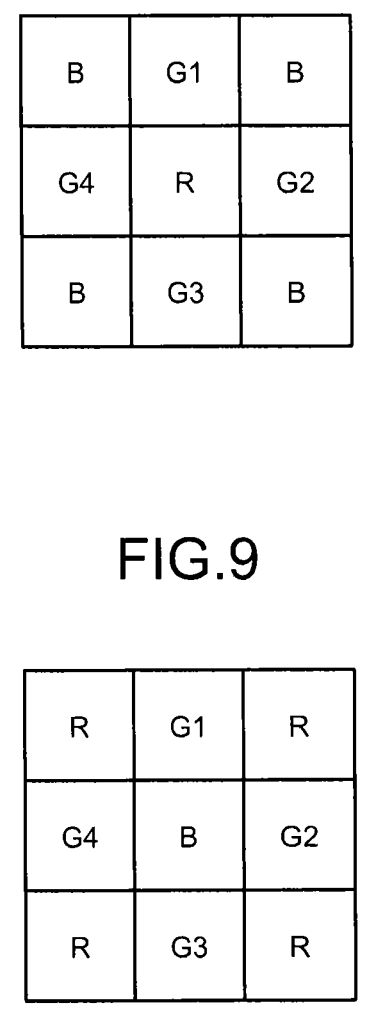

FIGS. 8 and 9 are views describing the generation of the first luminance information in the luminance information generating section. The luminance information generating section 42 calculates a luminance value of the G component through an interpolation process of the luminance value detected by the peripheral G pixels for the R pixel and the B pixel.

The luminance information generating section 42 references the luminance value detected by the four G pixels contained in a 3×3 pixel block having the R pixel as a center, as illustrated in FIG. 8, for example, in the calculation of the luminance value of the G component for the R pixel. The luminance information generating section 42 calculates the luminance value of the G component in the R pixel through the following equation, for example. In the equation, the terms "G1", "G2", "G3", and "G4" respectively represent the luminance values of the G components detected by the G pixels (G1, G2, G3, and G4) illustrated in FIG. 8.

(luminance value of $G$ component in $R$ pixel)=$(G1+G2+G3+G4)/4$

The luminance information generating section 42 references the luminance value detected by the four G pixels contained in a 3×3 pixel block having the B pixel as a center, as illustrated in FIG. 9, for example, in the calculation of the luminance value of the G component for the B pixel. The luminance information generating section 42 calculates the luminance value of the G component in the B pixel through the following equation, for example.

(luminance value of $G$ component in $B$ pixel)=$(G1+G2+G3+G4)/4$

The luminance information generating section 42 outputs the luminance value detected by the G pixel and the luminance value of the G component calculated for the R pixel and the B pixel as the first luminance information 55. The solid-state imaging device 12 adopts the G component for the first luminance information 55 because the information on the luminance can be obtained the most for the G component out of each component of R, G, and B.

The method of the interpolation process by the luminance information generating section 42 can be appropriately changed. For instance, the luminance information generating section 42 may generate the first luminance information 55 through a method of demosaicing process.

The imaging processing circuit 20 temporarily stores, for example, the monochrome image data 51 and the first luminance information 55 in the frame memory 26 (see FIG. 3). The disparity amount calculating section 43 calculates the disparity amount of the RAW image (first image) acquired by the color image sensor 23, and the monochrome image (second image) acquired by the monochrome image sensor 24. The disparity amount calculating section 43 calculates the disparity amount on the basis of the first luminance information 55 and the monochrome image data 51 read out from the frame memory 26.

The disparity amount calculating section 43 assumes the monochrome image data 51 as the second luminance information and uses it in the calculation of the disparity amount. The second luminance information is luminance information contained in the monochrome image data 51, which is the second image data, and is, for example, information corresponding to the luminance component of the YUV color space.

In addition to using the monochrome image data 51 as the second luminance information as is, the disparity amount calculating section 43 may use the second luminance information obtained by calculation process or the like of the monochrome image data 51. The calculation of the disparity amount and the focus adjustment corresponding to the disparity amount will be described later.

The disparity correcting section 44 corrects the disparity of the luminance image of the G component by the first luminance information 55 and the monochrome image by the monochrome image data 51 on the basis of the disparity amount calculated by the disparity amount calculating section 43. The disparity correcting section 44 corrects the disparity of the monochrome image with the luminance image of the G component as a reference, for example.

The disparity correcting section 44 may correct the disparity of the luminance image of the G component with the monochrome image as a reference. In this case, the imaging processing circuit 20 also performs the disparity correction similar to the luminance image of the G component on the color information 54.

The luminance information synthesizing section 45 synthesizes the first luminance information 55 and the monochrome image data 51 subjected to the correction of disparity in the disparity correcting section 44 to generate synthesized luminance information 56.

The resolution restoring section 46 performs resolution restoration on the synthesized image by the synthesized luminance information 56. The resolution restoring section 46 presumes lens characteristics such as a blur amount of the first imaging lens 21 and the second imaging lens 22, and performs the resolution restoration based on the presumed lens characteristics.

An optical transmission coefficient (point spread function: PSF), for example, is used for the lens characteristics. An estimation method by the least square method, for example, is used for the presumption of the PSF. The effect of the resolution restoration depends on an algorithm used in the restoration. The resolution restoring section 46 uses, for example, Richardson-Lucy method to restore an image close to the original subject image.

The camera module 10 holds, in advance, individual information such as manufacturing error and lens characteristics on each of the first imaging lens 21, the second imaging lens 22, the color image sensor 23, and the monochrome image sensor 24 to obtain a reliable effect of the resolution restoration. Such individual information is stored, for example, in an OTP (one time programmable memory) (not illustrated) in the solid-state imaging device 12 or the ISP 13.

The LPF 47 performs a smoothing process on the color information 54 from the color signal separating section 41. The LPF 47 reduces the color noise by the smoothing process of the color information 54. The imaging processing circuit 20 may perform, for example, a noise reduction process in place of the smoothing process by the LPF 47 with respect to the color information 54.

The image synthesizing section 48 synthesizes the synthesized luminance information 56 subjected to the resolution restoration by the resolution restoring section 46 and the color information 54 subjected to the smoothing process by the LPF 47 to generate synthesized image data 57. The imaging processing circuit 20 outputs the synthesized image data 57 generated by the image synthesizing section 48.

The solid-state imaging device 12 can obtain the second luminance information having a contour component of high signal to noise ratio (SNR) and resolution by the monochrome image sensor 24. Since a clear contour component can be obtained from the second luminance information, the imaging processing circuit 20 can extract the color information 54 in preference to the luminance information 53 in the color signal separating section 41 for the RAW image data 52 from the color image sensor 23. The imaging processing circuit 20 thus can obtain high sensitivity for the color component along with the contour component.

The image synthesizing section 48 is not limited to generating the synthesized image data 57 including the color information 54 and the synthesized luminance information 56 obtained by the synthesis of the first luminance information 55 and the second luminance information. The image synthesizing section 48 merely needs to generate the synthesized image data 57 including at least the color information 54 and the second luminance information. The imaging processing circuit 20 includes at least the color information 54 and the second luminance information in the synthesized image data 57 so that high sensitivity can be obtained for the color component and the contour component.

Figure 10:
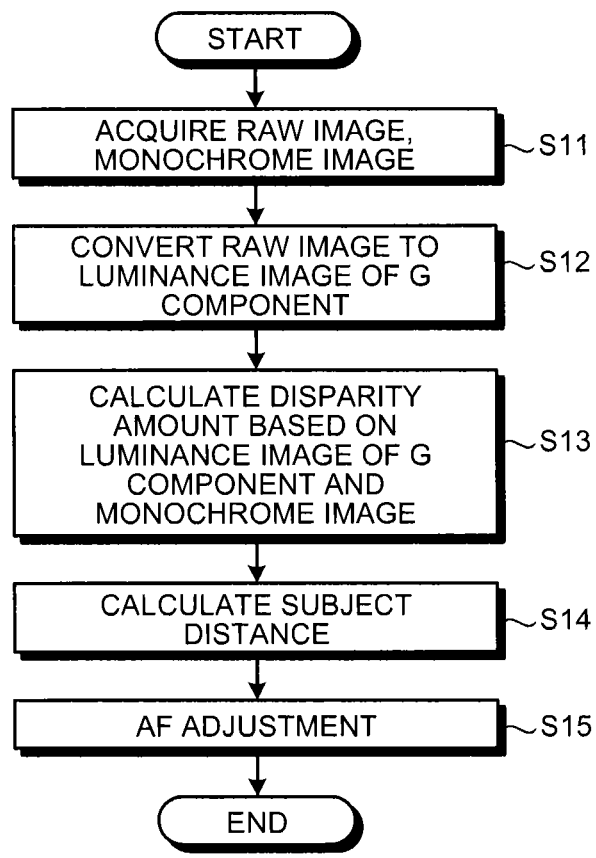
FIG. 10 is a flowchart illustrating a procedure for the focus adjustment in the camera module.

The details on the method for calculating the disparity amount, and the focus adjustment corresponding to the disparity amount will now be described. FIG. 10 is a flowchart illustrating a procedure for the focus adjustment in the camera module. The solid-stage imaging device 12 acquires the RAW image, which is the first image, by the imaging in the color image sensor 23, and acquires the monochrome image, which is the second image, by the imaging in the monochrome image sensor 24 (step S11).

The solid-state imaging device 12 generates the first luminance information 55 from the RAW image data 52 in the luminance information generating section 42 to convert the RAW image to the luminance image of the G component (step S12). The disparity amount calculating section 43 calculates the disparity amount on the basis of the luminance image of the G component and the monochrome image (step S13).

Figure 11:
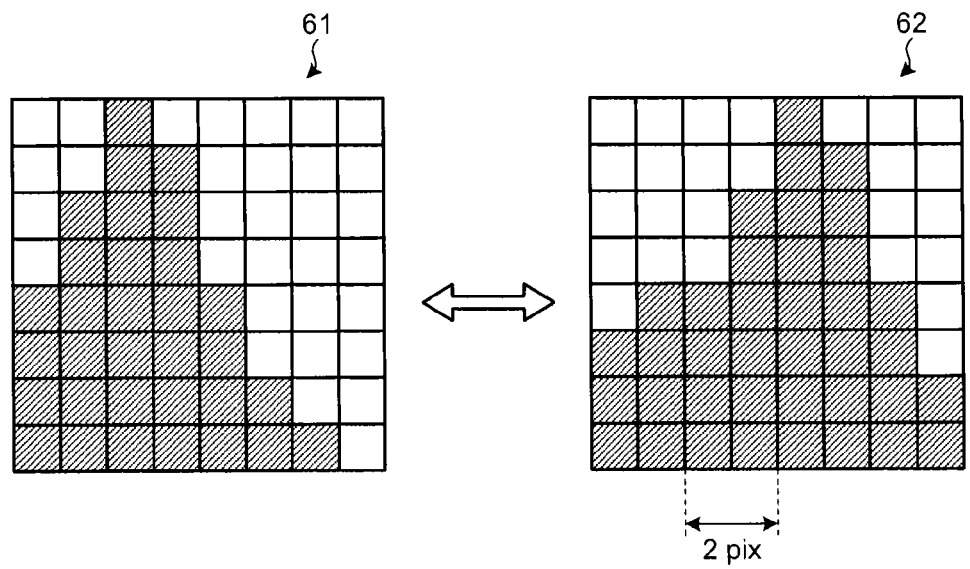
FIG. 11 is a view describing the calculation of a disparity amount from a luminance image of a G component and a monochrome image.

FIG. 11 is a view describing the calculation of the disparity amount from the luminance image of the G component and the monochrome image. In this example, the disparity amount calculating section 43 (see FIG. 7) converts the shift of the monochrome image 62 to the number of pixels with the luminance image 61 of the G component as a reference, and assumes the same as the disparity amount. The disparity amount calculating section 43 adopts the method of block matching, for example, to calculate the shift between the images in a simplified manner.

In the illustrated example, the monochrome image 62 is shifted by two pixels towards the right with respect to the luminance image 61 of the G component. In this case, the disparity amount calculating section 43 outputs the number of pixels "2" as a disparity amount. The disparity correcting section 44 (see FIG. 7) performs disparity correction of moving the monochrome image 62 by two pixels towards the left.

Figure 12:
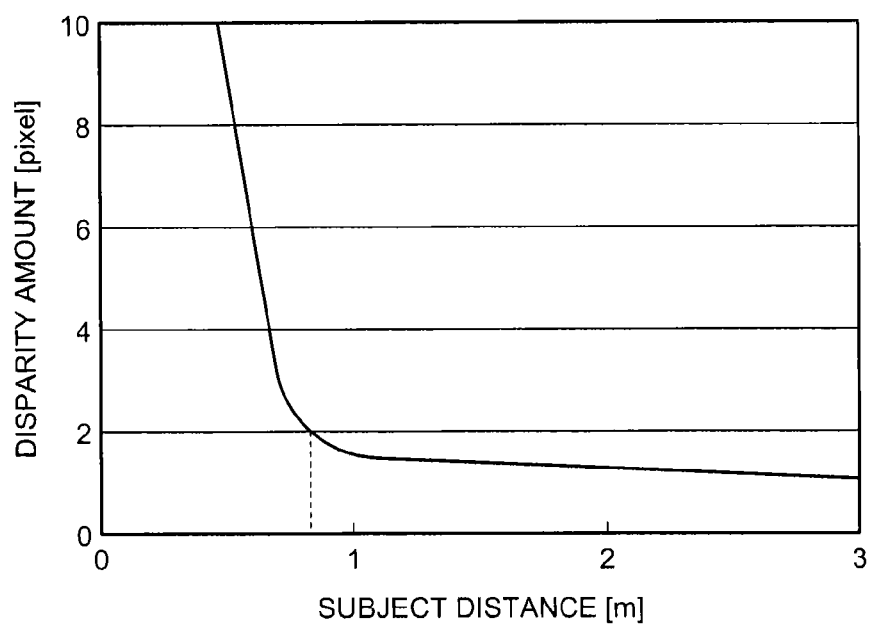
FIG. 12 is a view describing the calculation of a subject distance in a subject distance calculating unit.

The subject distance calculating unit 36 (see FIG. 3) calculates a subject distance according to the disparity amount obtained in step S13 (step S14). FIG. 12 is a view describing the calculation of the subject distance in the subject distance calculating unit. The subject distance calculating unit 36 obtains the subject distance based on the distance between the first imaging lens 21 and the second imaging lens 22, and the disparity amount.

For instance, a relationship of the disparity amount and the subject distance can be expressed as in the illustrated graph with respect to the predefined distance between the first imaging lens 21 and the second imaging lens 22. The subject distance calculating unit 36 outputs "0.7 (m)" as the subject distance corresponding to the disparity amount "2 (pixel)" from the relationship of the disparity amount and the subject distance.

The AF driving driver 35 performs the AF adjustment by the control of the lens driving unit 27 corresponding to the subject distance calculated in step S14 (step S15). The camera module 10 terminates the operation for the AF adjustment in the above manner.

According to the present embodiment, the camera module 10 adjusts the focus using the disparity amount of the images acquired by the two image sensors. The camera module 10 enables high speed focus adjustment because the operation of focusing while moving the imaging lens and a complex signal processing are not necessary. The camera module 10 does not require an AF dedicated sensor and the configuration of branching the light of when adopting the existing phase difference detection method.

The solid-state imaging device 12 of the present embodiment acquires the first luminance information 55 and the color information 54 from the RAW image, and acquires the monochrome image data 51, which is the second luminance information, from the monochrome image. The imaging processing circuit 20 synthesizes the second luminance information from the W pixel having high sensitivity compared to other color pixels and the first luminance information 55 generated for the G component in the luminance information synthesizing section 45 to obtain a highly sensitive synthesized image. The solid-state imaging device 12 ensures high color reproducibility by synthesizing the color information 54 acquired from the RAW image in the imaging processing circuit 20.

The solid-state imaging device 12 can suppress the lowering in color reproducibility by the crosstalk compared to when using an image sensor in which the W pixel coexists in each color pixel. The solid-state imaging device 12 can also suppress the lowering in sensitivity of each color component caused by the saturation of the output of the W pixel prior to the other color pixels.

The camera module 10 does not need to ensure a long focal length to respond to the enlargement of the pixel, and thus thinning and miniaturization can be achieved. Therefore, the camera module 10 enables miniaturization and high speed focus adjustment, whereby an image excelling in color reproducibility can be photographed at high sensitivity and high resolution.

At least one part of each element of the imaging processing circuit 20 illustrated in FIG. 7 may be arranged in the signal processing circuit 33 of the ISP 13. At least one part of each process illustrated in FIG. 6 performed in the signal processing circuit 33 may be performed in the imaging processing circuit 20. The solid-state imaging device 12 may appropriately omit the frame memory 26 depending on the configuration of the imaging processing circuit 20 and the signal processing circuit 33.

FIG. 13 is a chart describing a variant related to the acquisition of synthesized luminance information by the synthesis of the first luminance information and the second luminance information. In the chart, type 1 illustrates a mode described up to now in the present embodiment.

In type 1, the solid-state imaging device 12 includes the monochrome image sensor 24 in which the W pixels are arranged, and the color image sensor 23 in which each pixel of RGB is in Bayer arrangement. The solid-state imaging device 12 acquires the second luminance information including the luminance value of the W component, and the first luminance information 55 of the G component acquired through the interpolation process of the RAW image data 52.

The monochrome image sensor 24 may arrange gray pixels instead of the W pixels. The gray pixel detects a gray scale. The imaging processing circuit 20 performs signal processing similar to when applying the W pixel even when applying the gray pixel.

In type 2, the solid-state imaging device 12 uses the monochrome image sensor 24 in which the G pixels are arranged, and the color image sensor 23 similar to that of type 1. The solid-state imaging device 12 acquires the second luminance information including the luminance value of the G component. The solid-state imaging device 12 acquires the first luminance information 55 of the G component as in type 1.

FIG. 14 is a view describing the array of pixels in the color image sensor used in type 3. In type 3, the color image sensor 23 in which the R pixel and the B pixel are alternately arranged is used. The solid-state imaging device 12 uses the relevant color image sensor 23 and the monochrome image sensor 24 similar to that of type 2. The solid-state imaging device 12 acquires the second luminance information including the luminance value of the G component as in type 2.

The color signal separating section 41 (see FIG. 7) extracts the luminance information 53 for the R component and the B component from the RAW image data 52. The luminance information generating section 42 acquires the luminance value of the R component and the luminance value of the B component for each pixel by the interpolation process of the luminance information 53. The luminance information generating section 42 adds the luminance value of the R component and the luminance value of the B component, and assumes the same as a luminance value of an M (magenta) component. In type 3, the first luminance information 55 including the luminance value of the M component is acquired.

FIG. 15 is a view describing the array of pixels in the color image sensor used in type 4. In type 4, the color image sensor 23 in which a C (cyan) pixel and a Y (yellow) pixel are alternately arranged is used. The solid-state imaging device 12 uses the relevant color image sensor 23 and the monochrome image sensor 24 similar to that of type 2.

As in type 2, the solid-state imaging device 12 acquires the second luminance information including the luminance value of the G component. The color signal separating section 41 extracts the luminance information 53 for the C component and the Y component from the RAW image data 52. The luminance information generating section 42 acquires the luminance value of the C component and the luminance value of the Y component for each pixel by the interpolation process of the luminance information 53.

Figures 16, 17:
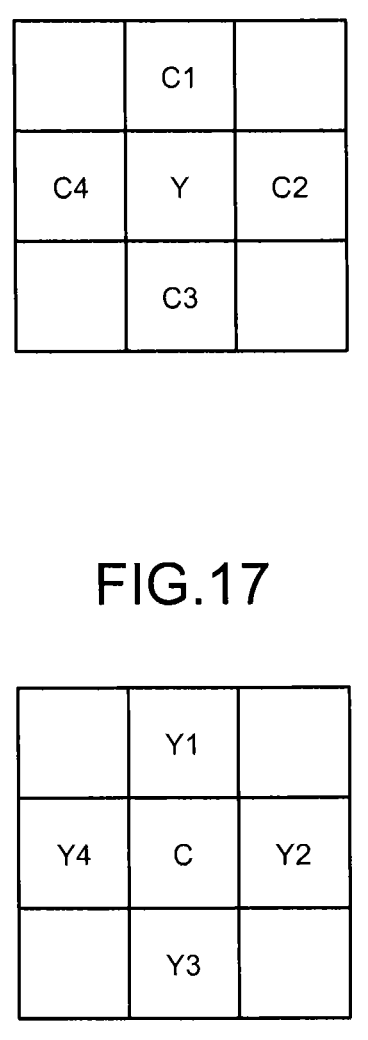

FIG. 16 is a view describing the calculation of the luminance value of the C component for the Y pixel. The luminance information generating section 42 references the luminance value detected by the four C pixels contained in a 3×3 pixel block having the Y pixel as the center, for example. The luminance information generating section 42 calculates the luminance value of the C component for the Y pixel through the following equation, for example. In the equation, the terms "C1", "C2", "C3", and "C4" respectively represent the luminance values of the C components detected by the c pixels (C1, C2, C3, and C4) illustrated in FIG. 16.

(luminance value of C component in Y pixel)=(C1+ C2+C3+C4)/4

FIG. 17 is a view describing the calculation of the luminance value of the Y component for the C pixel. The luminance information generating section 42 references the luminance value detected by the four Y pixels contained in a 3×3 pixel block having the C pixel as the center, for example. The luminance information generating section 42 calculates the luminance value of the Y component for the C pixel through the following equation, for example. In the equation, the terms "Y1", "Y2", "Y3", and "Y4" respectively represent the luminance values of the Y components detected by the Y pixels (Y1, Y2, Y3, and Y4) illustrated in FIG. 17.

(luminance value of Y component in C pixel)=(Y1+ Y2+Y3+Y4)/4

The luminance information generating section 42 adds the luminance value of the C component and the luminance value of the Y component, and assumes the same as a luminance value of the G component. In type 4, the first luminance information 55 including the luminance value of the G component is acquired. When adopting any one of types 1 to 4, the solid-state imaging device 12 can retrieve the image excelling in color reproducibility at high sensitivity and high resolution. In types 3 and 4, the second luminance information including the luminance value of the W component may be acquired as in type 1.

Figure 18:
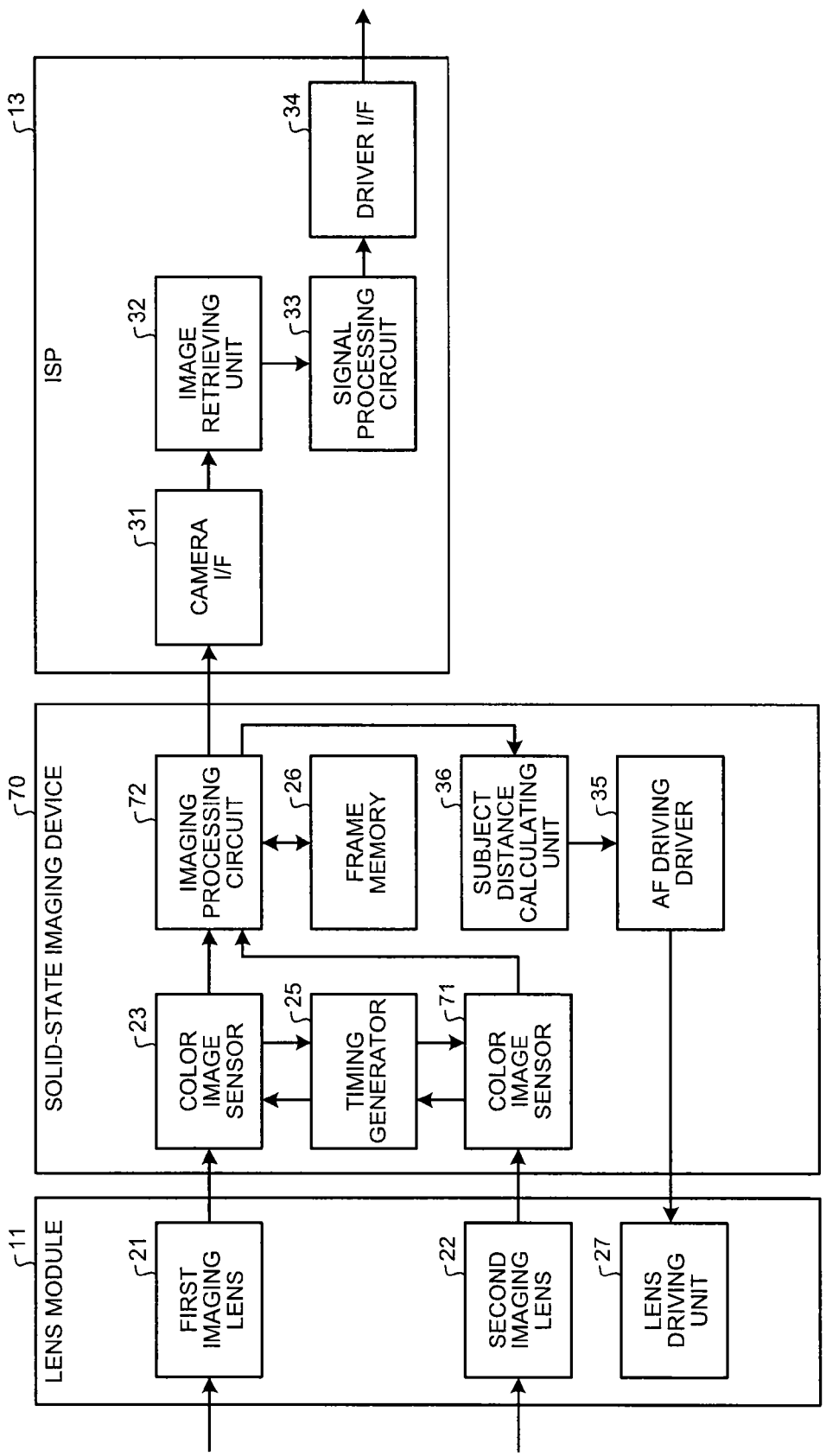
FIG. 18 is a block diagram illustrating a partial configuration of the camera module including a solid-state imaging device according to a variant of the embodiment.

FIG. 18 is a block diagram illustrating a partial configuration of the camera module including a solid-state imaging device according to a variant of the embodiment. A solid-state imaging device 70 according to the present variant includes a color image sensor 71 arranged in place of the monochrome image sensor 24 illustrated in FIG. 3 for the second image sensor. The color image sensor 71 detects a plurality of color lights.

Figure 19:
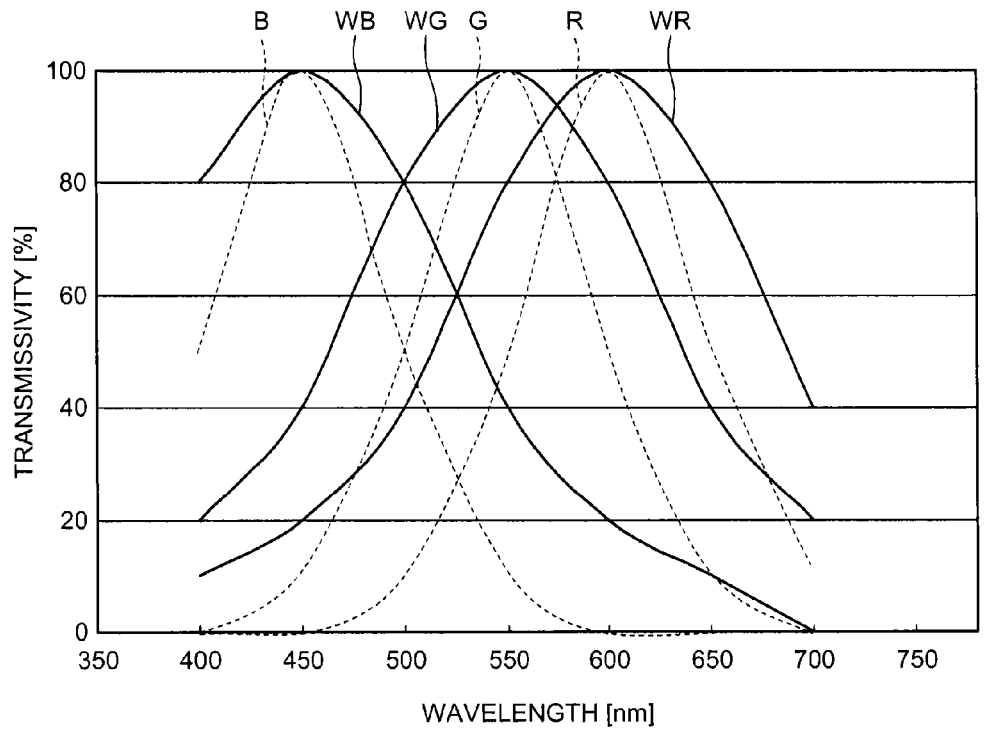
FIG. 19 is a view illustrating transmission properties of the color filter arranged in each color pixel in comparison for the first and second image sensors.

FIG. 19 is a view illustrating transmission properties of the color filter arranged in each color pixel in comparison for the first and second image sensors. The color image sensor 23, which is the first image sensor, includes each pixel of R, G, and B. The R pixel includes a color filter for selectively transmitting the R light. The G pixel includes a color filter for selectively transmitting the G light. The B pixel includes a color filter for selectively transmitting the B light.

The color image sensor 71, which is the second image sensor, includes each pixel of wider red (WR), wider green (WG), and wider blue (WB). The WR pixel includes a color filter for selectively transmitting the WR light. The WR light is a light having substantially the same peak wavelength as that of the R light and having a wavelength region wider than that of the R light. The WG pixel includes a color filter for transmitting the WG light. The WG light is a light having substantially the same peak wavelength as that of the G light and having a wavelength region wider than that of the G light. The WB pixel includes a color filter for transmitting the WB light. The WB light is a light having substantially the same peak wavelength as that of the B light and having a wavelength region wider than that of the B light.

The wavelength region of each color light detected by the color image sensor 71 is set wide compared to the wavelength region of each color light detected by the color image sensor 23. In the color image sensor 71, each pixel of WR, WG, and WB is arranged, for example, as a Bayer arrangement. The color image sensor 71 outputs the RAW image data as the second image signal.

Each color filter for WR, WG, and WB arranged in the color image sensor 71 transmits the light of a wavelength region wider by about 50 to 100 nm, for example, with respect to each color filter of R, G, and B arranged in the color image sensor 23 at a transmissivity of 50%. Each pixel of WR, WG, and WB of the color image sensor 71 can obtain high sensitivity by the detection of the light of a wide wavelength region with respect to each pixel of R, G, and B of the color image sensor 23.

Figure 20:
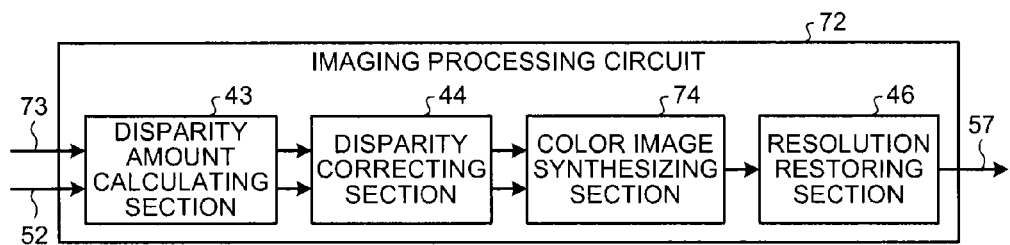
FIG. 20 is a block diagram illustrating a configuration of an imaging processing circuit according to a variant of the embodiment.

FIG. 20 is a block diagram illustrating a configuration of an imaging processing circuit according to a variant of the embodiment. The imaging processing circuit 72 includes the disparity amount calculating section 43, the disparity correcting section 44, a color image synthesizing section 74, and the resolution restoring section 46.

The disparity amount calculating section 43 uses the RAW image data 52 input from the color image sensor 23 and the RAW image data 73 input from the color image sensor 71 to calculate the disparity amount of the first RAW image acquired by the color image sensor 23 and the second RAW image acquired by the color image sensor 71. The disparity amount calculating section 43 converts the shift of the second RAW image to the number of pixels with the first RAW image as a reference, for example, and assumes the same as the disparity amount.

The disparity correcting section 44 corrects the disparity of the first RAW image and the second RAW image. The color image synthesizing section 74 is an image synthesizing section for synthesizing the RAW image data 52 and 73 subjected to the correction of disparity in the disparity correcting section 44. The resolution restoring section 46 performs resolution restoration for the synthesized image by the color image synthesizing section 74. The imaging processing circuit 72 outputs the synthesized image data 57 subjected to the resolution restoration in the resolution restoring section 46.

The imaging processing circuit 72 synthesizes the RAW image data 73 from each pixel of WR, WG, and WB having a high sensitivity compared to each pixel of R, G, and B and the RAW image data 52 from each pixel of R, G, and B to obtain a highly sensitive synthesized image. The solid-state imaging device 70 ensures high color reproducibility by the synthesis of the RAW image data 52 and 73. The solid-state imaging device 70 according to the present variant also enables photographing of high sensitivity and high color reproducibility.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A solid-state imaging device comprising:
a first image sensor configured to output a first image signal corresponding to an intensity distribution of color lights contained in light entering from a subject;
a second image sensor configured to output a second image signal corresponding to a luminance distribution of the light entering from the subject;
an imaging processing circuit configured to perform signal processing of the first image signal and the second image signal; and a focus drive control section configured to control focus drive of a first imaging lens and a second imaging lens, the first imaging lens causing the light from the subject to enter the first image sensor, and the second imaging lens causing the light from the subject to enter the second image sensor; wherein the imaging processing circuit includes, a luminance information generating section configured to generate first luminance information for a specific color component from luminance information extracted from the first image signal, and a disparity amount calculating section configured to calculate a disparity amount of a first image acquired by the first image sensor and a second image acquired by the second image sensor on the basis of the first luminance information and second luminance information, which is luminance information contained in the second image signal; and the focus drive control section controls the focus drive according to a subject distance obtained using the disparity amount.

2. The solid-state imaging device according to claim 1, wherein the imaging processing circuit further includes an image synthesizing section configured to generate synthesized image data including color information extracted from the first image signal and the second luminance information.

3. The solid-state imaging device according to claim 2, wherein the imaging processing circuit further includes a luminance information synthesizing section configured to generate synthesized luminance information by synthesizing the first luminance information and the second luminance information; and the image synthesizing section generates the synthesized image data including the synthesized luminance information and the color information.

4. The solid-state imaging device according to claim 3, wherein the imaging processing circuit further includes a resolution restoring section configured to perform resolution restoration on the synthesized image by the synthesized luminance information; and the image synthesizing section synthesizes the color information and the synthesized luminance information subjected to the resolution restoration.

5. The solid-state imaging device according to claim 3, wherein the imaging processing circuit further includes a smoothing processing section configured to perform a smoothing process on the color information; and the image synthesizing section synthesizes the synthesized luminance information and the color information subjected to the smoothing process.

6. The solid-state imaging device according to claim 1, wherein the imaging processing circuit further includes a disparity correcting section configured to correct a disparity of the first image and the second image in accordance with the disparity amount.

7. The solid-state imaging device according to claim 1, wherein the imaging processing circuit further includes an image signal separating section configured to separate the first image signal to the color information and the first luminance information.

8. The solid-state imaging device according to claim 7, wherein the image signal separating section extracts the color information in preference to the first luminance information from the first image signal.

9. The solid-state imaging device according to claim 1, further comprising:

a frame memory configured to store at least one of either the first image signal or the second image signal; wherein the first image sensor, the second image sensor, and the frame memory are arranged on a common substrate.

10. The solid-state imaging device according to claim 1, wherein the first image sensor is a color image sensor configured to detect a plurality of the color lights; and the second image sensor is a monochrome image sensor configured to detect a single color light.

11. The solid-state imaging device according to claim 10, wherein the disparity amount calculating section calculates the disparity amount assuming monochrome image data, which is the second image signal from the monochrome image sensor, as the second luminance information.

12. The solid-state imaging device according to claim 10, wherein the monochrome image sensor includes a white pixel for detecting a white light.

13. The solid-state imaging device according to claim 1, wherein the first image sensor and the second image sensor are both color image sensors configured to detect a plurality of color lights; and a wavelength region of each color light detected by the second image sensor is set wide compared to a wavelength region of each color light detected by the first image sensor.

14. A camera module comprising:

a first imaging lens and a second imaging lens configured to retrieve light from a subject and form an image of a subject image;

a lens driving unit configured to perform focus drive of the first imaging lens and the second imaging lens; and a solid-state imaging device configured to image the subject image; wherein the solid-state imaging device includes, a first image sensor configured to output a first image signal corresponding to an intensity distribution of color lights contained in the light retrieved by the first imaging lens, a second image sensor configured to output a second image signal corresponding to a luminance distribution of the light retrieved by the second imaging lens;

an imaging processing circuit configured to perform signal processing of the first image signal and the second image signal, and a focus drive control section configured to control the lens driving unit; the imaging processing circuit includes, a luminance information generating section configured to generate first luminance information for a specific color component from luminance information extracted from the first image signal, and a disparity amount calculating section configured to calculate a disparity amount of a first image acquired by the first image sensor and a second image acquired by the second image sensor on the basis of the first luminance information and second luminance information, which is luminance information contained in the second image signal; and the focus drive control section controls the lens driving unit according to a subject distance obtained using the disparity amount.

15. The camera module according to claim 14, wherein
the first imaging lens and the second imaging lens are attached to a common lens holder; and
the lens driving unit collectively drives the first imaging lens and the second imaging lens by moving the lens holder.

16. The camera module according to claim 14, wherein
the solid-state imaging device includes a frame memory configured to store at least one of either the first image signal or the second image signal; and
the first image sensor, the second image sensor, and the frame memory are arranged on a common substrate.

17. The camera module according to claim 14, wherein the imaging processing circuit further includes,
a luminance information synthesizing section configured to generate synthesized luminance information by synthesizing the first luminance information and the second luminance information, and
an image synthesizing section configured to generate synthesized image data including the synthesized luminance information and the color information.

18. The camera module according to claim 17, wherein
the imaging processing circuit further includes a resolution restoring section configured to perform resolution restoration on the synthesized image by the synthesized luminance information; and
the resolution restoring section performs the resolution restoration based on individual information held by the camera module in advance.

19. A focus adjustment method of a camera module comprising:
retrieving light from a subject by a first imaging lens and acquiring a first image corresponding to an intensity distribution of color lights contained in the light from the subject;
retrieving light from the subject by a second imaging lens and acquiring a second image corresponding to a luminance distribution of the light from the subject;
converting the first image to a luminance image for a specific color component;
calculating a disparity amount of the first image and the second image on the basis of the luminance image and the second image;
calculating a subject distance in accordance with the disparity amount; and
controlling focus drive of the first imaging lens and the second imaging lens in accordance with the subject distance.

20. The focus adjustment method of the camera module according to claim 19, wherein the subject distance is calculated on the basis of a distance between the first imaging lens and the second imaging lens, and the disparity amount.

* * * * *